United States Patent [19]

Scheibner et al.

[11] Patent Number: 5,229,939

[45] Date of Patent: Jul. 20, 1993

[54] METHOD AND APPARATUS FOR CORRECTING A SHEAR WAVE SLOWNESS ESTIMATE FROM A SONIC WELL TOOL AND PRODUCING AN OUTPUT MEDIUM REFLECTING A TRUE VALUE OF SHEAR WAVE SLOWNESS

[75] Inventors: David J. Scheibner; Peter T. Wu, both of Houston, Tex.

[73] Assignee: Schlumberger Technology Corporation, Houston, Tex.

[21] Appl. No.: 852,821

[22] Filed: Feb. 9, 1992

Related U.S. Application Data

[63] Continuation of Ser. No. 361,609, Jun. 5, 1989, abandoned.

[51] Int. Cl.$^5$ .................... G01V 1/00; G06F 15/48; G06F 15/50; G06G 7/00; G06G 7/76
[52] U.S. Cl. .................... 364/422; 367/25; 367/75
[58] Field of Search ............... 364/422, 421; 367/25, 367/35, 86, 88, 75

[56] References Cited

U.S. PATENT DOCUMENTS

| | | | |
|---|---|---|---|
| 4,516,228 | 5/1985 | Zemanek, Jr. ................ | 367/25 |
| 4,562,556 | 12/1985 | Ingram et al. ................ | 364/422 |
| 4,575,830 | 3/1986 | Ingram et al. ................ | 364/422 |
| 4,594,691 | 6/1986 | Kimball et al. . | |
| 4,633,449 | 12/1986 | Ingram et al. ................ | 364/422 |
| 4,649,526 | 3/1987 | Winbow et al. ................ | 367/25 |
| 4,698,792 | 10/1987 | Kurkjian et al. ................ | 364/422 |
| 4,701,891 | 10/1987 | Castagna et al. ................ | 364/422 |
| 4,703,460 | 10/1987 | Kurkjian et al. ................ | 364/422 |

OTHER PUBLICATIONS

"Acoustic multipole sources in fluid filled boreholes", Geophysics, vol. 51, No. 1 (Jan. 86), 148-163.
"A theoretical study of acoustics-wave S-wave and P-wave velocity logging with conventional and dipole sources in soft formations", Geophysics, vol. 53, No. 20, Oct. 88, 1334-1342.
"Semblance processing of borehole acoustic array data", Geophysics, vol. 49, No. 3, Mar. 84, pp. 274-281.
"Continuous Acoustic Shear Wave Logging", SPWLA 25th Annual Logging Symposium, Jun. 10-13, 1984.
"Shear Wave Logging with Dipole Sources", Geophysics, vol. 53, No. 5, (May 1988), pp. 659-667.
"Shear wave logging in elastic formations", J. Acoust. Soc. Am. 84(6), Dec. 1988.
"Compressional and shear arrivals in a multipole sonic log", Geophysics, vol. 50, No. 7, Jul. 85, pp. 1119-1126.

Primary Examiner—Roy Envall, Jr.
Assistant Examiner—Laura Brutman
Attorney, Agent, or Firm—Henry N. Garrana; John H. Bouchard

[57] ABSTRACT

A borehole correction software of a multipole sonic well tool adapted to be disposed in a borehole determines a true, corrected value of shear wave slowness from a measured uncorrected shear wave slowness value by first building a look up table comprising hole diameter, measured synthetic shear wave slowness and correction factor, and using the table in a system including the look up table and a multiplier to determine a bias, which bias is subtracted from the measured uncorrected shear wave slowness to produce an output medium reflecting a true, corrected value of shear wave slowness. The measured uncorrected shear wave slowness values are input to the look up table. For a given hole diameter, the measured uncorrected shear wave slowness is matched to a measured synthetic shear wave slowness, and a value of correction factor is determined from the table. The correction factor is multiplied by the measured uncorrected shear wave slowness, via the multiplier, and a bias figure is determined. The bias figure is subtracted from the measured uncorrected shear wave slowness value, and a true, corrected shear wave slowness figure is the result. A plurality of the true, corrected shear wave slowness figures are determined using this technique and an output medium is produced which displays a log reflecting the true corrected shear wave slowness figures. This output medium may include a computer printout, the printout being given to a customer for his analysis of the characteristics of a formation within the borehole and the possibility of oil existing in the formation.

11 Claims, 8 Drawing Sheets

METHOD AND APPARATUS FOR CORRECTING A SHEAR WAVE SLOWNESS ESTIMATE FROM A SONIC WELL TOOL AND PRODUCING AN OUTPUT MEDIUM REFLECTING A TRUE VALUE OF SHEAR WAVE SLOWNESS

This is a continuation of application Ser. No. 07/361,609 filed Jun. 5, 1989, now abandoned.

BACKGROUND OF THE INVENTION

The subject matter of the present invention relates to multipole sonic tools, and more particularly, to a borehole correction system for such sonic tool designed to correct measured estimated values of shear wave slowness, thereby producing an output medium including a log reflecting a true corrected value of shear wave slowness.

In a multipole sonic well tool, adapted to be disposed in a borehole and designed to produce logging data for presentation to a customer, a set of waveforms (e.g., dipole waveforms), received from a formation and representative of the characteristics of a formation, undergo processing by a measurement extraction software in a well logging truck computer for estimating a shear wave slowness component of the dipole waveforms. However, the processing produces an inherent bias in the shear wave slowness data, which bias distorts the accuracy of the resultant shear wave slowness data. Therefore, when the multipole waveforms are transmitted uphole to a well logging truck computer at a well surface, the processed waveforms must be corrected to eliminate the inherent bias created by the processing, thereby producing true, corrected values of shear wave slowness. Shear wave slowness generally represents the inverse velocity in microseconds per foot of a shear wave propagating within a formation. An output medium, for use by a customer, is generated including a waveform representing the true, corrected value of the shear wave slowness.

SUMMARY OF THE INVENTION

It is a primary object of the present invention to provide a borehole correction system for a multipole sonic well tool designed to correct a set of measured, estimated shear wave slowness data to eliminate an inherent bias produced during the estimation of such shear wave slowness data thereby providing a corresponding set of true, correct shear wave slowness data and an output medium reflecting a graphical representation of the true, correct shear wave slowness data for presentation to a customer.

It is a further object of the present invention to calculate a bias associated with each true shear wave slowness figure, of a set of synthetic true shear wave slowness figures, and a resultant correction factor for each calculated bias, to build a look-up table, and to utilize the look-up table in an operation whereby each bias is ultimately subtracted from each measured, estimated, uncorrected shear wave slowness figure to thereby obtain an output medium reflecting a graphical representation of a set of true, correct shear wave slowness figures.

It is a further object of the present invention to produce an output medium, such as a computer printout or a cathode ray tube (CRT) representation, setting forth the set of true, correct values of shear wave slowness figures, the output medium being adapted for presentation to a customer.

These and other objects of the present invention are accomplished by providing a borehole correction software adapted to be stored in a memory of a well logging truck computer. The truck computer is connected, via a cable, to a sonic tool, adapted to be disposed in a borehole of an oil well. The sonic tool includes a multipole sonic transmitter and a plurality of sonic receivers. When the sonic tool is disposed in the borehole, the sonic tool transmitter transmits a sonic pressure wave into a surrounding formation. A shear wave begins to propagate along the formation of the borehole. When the shear wave is sensed by the sonic receivers, multipole waveforms are generated representative of the characteristics of the formation. The waveforms are transmitted uphole via the cable to the well logging truck computer. When the waveforms are received by the truck computer, the computer executes a set of instructions termed the "measurement extraction software" stored in the memory of the truck computer. A part of the waveforms, received by the truck computer, comprises what is termed "shear wave" data. The measurement extraction software, when executed by the truck computer, receive the multipole waveforms and estimate therefrom the shear wave slowness data, the estimated shear wave slowness data being termed "measured uncorrected shear wave slowness (MUSWS)" data. However, the MUSWS data contains an inherent bias which is produced by the truck computer during the processing of the measurement extraction software. It is necessary to eliminate this bias. When executed, the instructions which comprise the borehole correction software of the present invention instructs a processor of the computer to first calculate a measured, synthetic shear wave slowness (MSSWS) figure, for each true value of the shear wave slowness of a set of hypothetical/synthetic true shear wave slowness figures, and a bias for each MSSWS figure. From this bias, a correction factor is determined. A look up table is created, the table comprising the measured synthetic shear wave slowness (MSSWS) figures and the corresponding correction factors for each diameter of the borehole. When the table is created, each of the measured uncorrected shear wave slowness (MUSWS) figures, received from the measurement extraction software, are input to the look-up table and corresponding correction factors are determined. The determined correction factors are used to further determine a bias. Each bias is subtracted from the corresponding MUSWS figure to obtain a true, corrected shear wave slowness (TCSWS) figure. An output medium is generated reflecting the true, corrected shear wave slowness figures in graphical form. This output medium is presented to a customer for his use in determining the characteristics of the formation surrounding the borehole and perhaps the possibility of oil existing in the formation.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein

FIG. 5-9 illustrate the function of the computer system of FIG. 3 when executing the borehole correction software of the present invention and generating the unique output medium of FIG. 4 and, more specifically.

DETAILED DESCRIPTION OF THE PREFERRED EMBODIMENT

Figures 1, 1A:
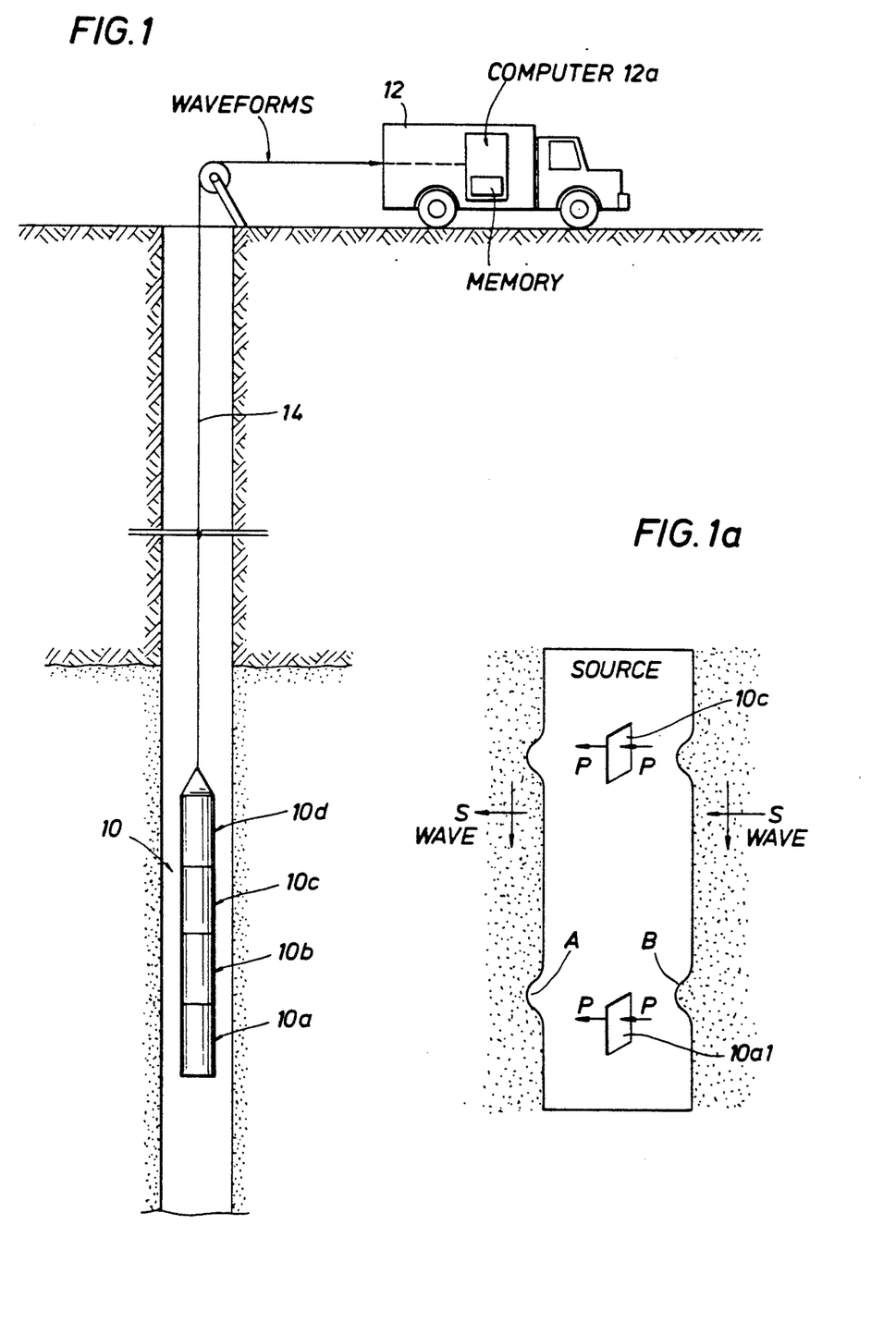
FIGS. 1 and 1a illustrate a well tool disposed in a borehole, a computer disposed in a truck connected to the well tool, and the effects of operation of such tool on the surrounding formation.

Referring to FIG. 1, a sonic well tool 10 is shown disposed in a borehole. A well logging truck 12 is connected to the sonic well tool via a cable 14. The truck 12 includes a computer 12a for analyzing data transmitted to the computer from the sonic well tool 10. The well tool 10 includes a transmitter 10a, an isolator section 10b, a plurality of receivers 10c, and an electronics cartridge 10d. The transmitter 10a of the sonic tool includes a dipole transmitter. FIG. 1a illustrates the function of the dipole transmitter. In FIG. 1a, the dipole transmitter creates a positive pressure wave A on one side of a piston 10a1 and a negative pressure wave B on the other side of the piston. The positive wave A and the negative wave B propagate up the formation to a receiver 10c. The receiver 10c transmits dipole waveforms to the well logging truck computer 12a via cable 14. The positive and negative waves A and B created by the dipole transmitter each include a shear wave in addition to a flexural and a compressional wave. The sonic well tool 10 of FIG. 1 is fully set forth in prior pending application Ser. No. 07/325,405, filed Mar. 17 1989, entitled "A Sonic Well Tool Transmitter and Receiver Array including an Attenuation and Delay Apparatus", now U.S. Pat. No. 5,036,945 the disclosure of which is incorporated by reference into this specification.

Figure 2A:
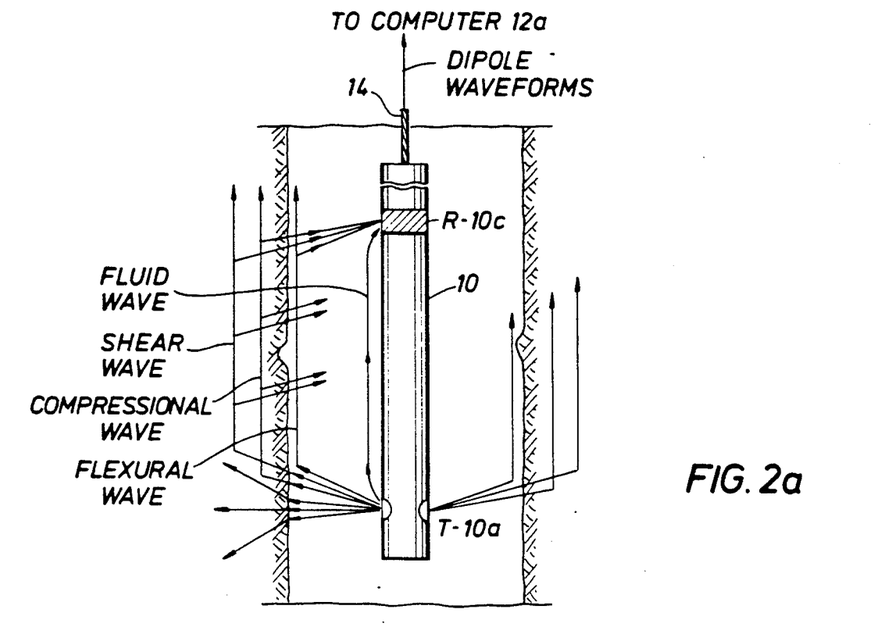
FIGS. 2a and 2b illustrate a set of shear waves, compressional waves and flexural waves propagating along a formation when a sonic well tool transmitter transmits a dipole sonic pressure wave into the formation.
Figure 2B:
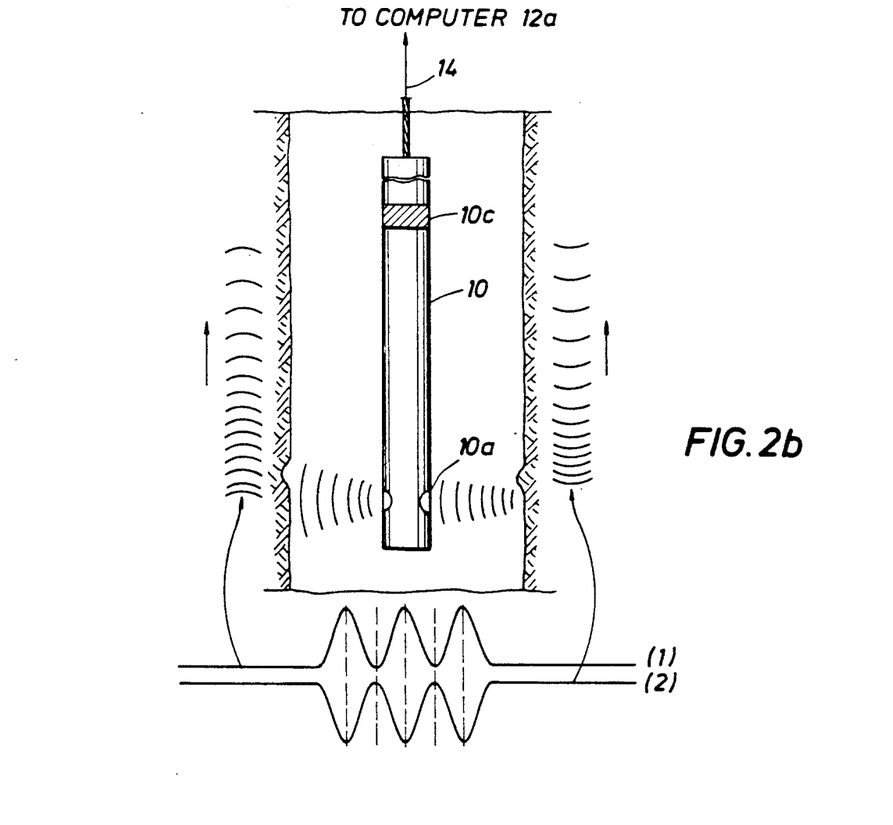

FIGS. 2a and 2b illustrate in more detail the shear wave, compressional wave and flexural wave propagating up the formation from transmitter 10a to receiver 10c of the sonic well tool 10 of FIG. 1. In FIG. 2a, note the positions of the various waves relative to one another in the formation. The cable 14 transmits the dipole waveforms to the truck computer 12a at the well surface. In FIG. 2b, note the positive wave (1) created in the formation on the left side of the tool, and the negative wave (2) created in the formation on the right side of the tool. Waves (1) and (2) propagate up the formation. Wave (1) is 180 degrees out of phase with respect to wave (2).

Figures 3, 7:
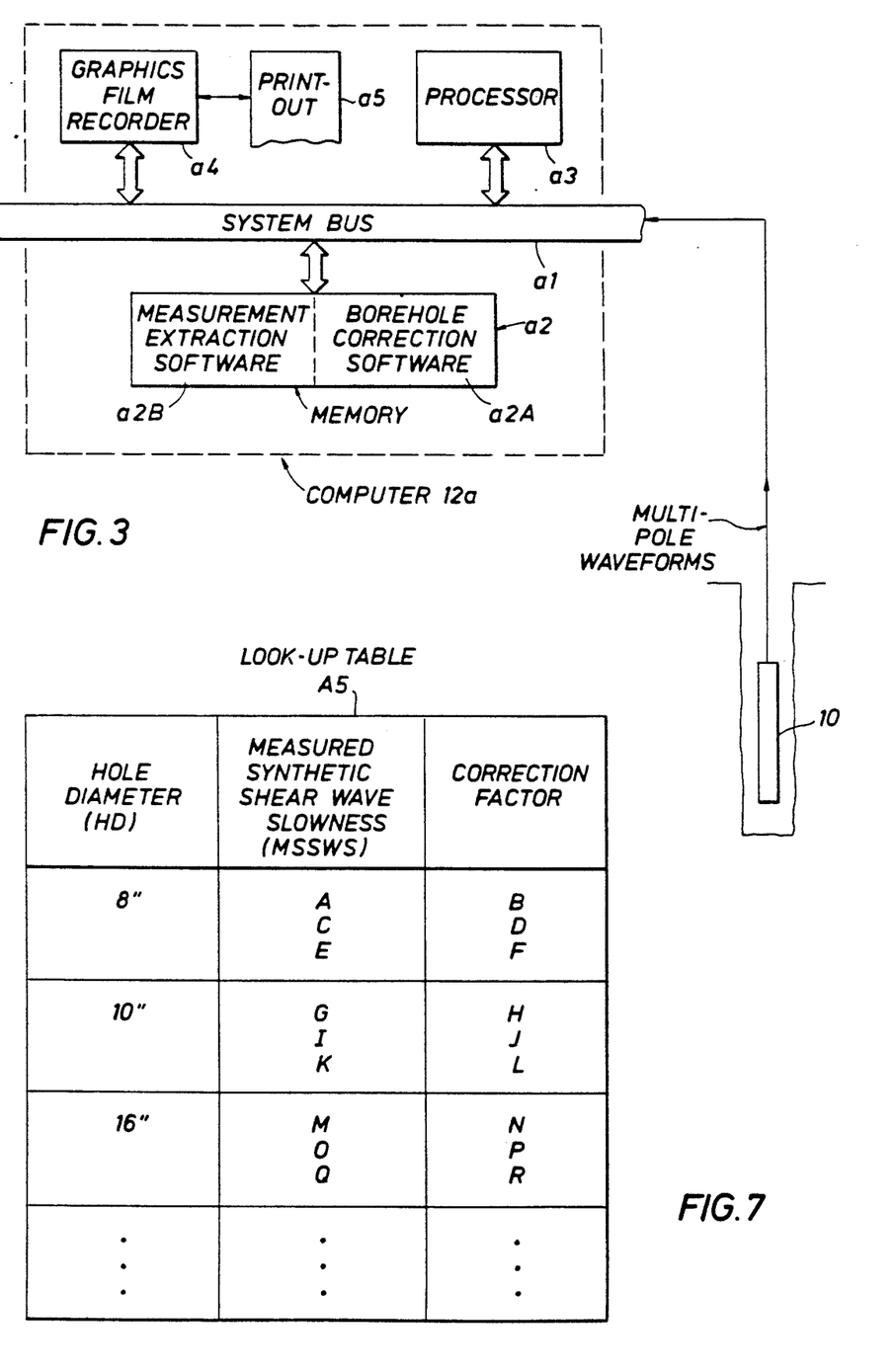
FIG. 3 illustrates a typical computer system representing the computer of FIG. 1 including a memory storing the borehole correction software of the present invention.
FIG. 7 illustrates a lookup table built from data collected in FIG. 5.

Referring to FIG. 3, a simple construction of the truck computer 12a of FIG. 1 is illustrated. In FIG. 3, a system bus a1 of the computer 12 is connected to the electronics cartridge 10d of receiver 10c of sonic tool 10. A memory (also termed a basic storage module or BSM) a2 is connected to the system bus a1. The memory a2 stores a set of software instructions, in accordance with the present invention, called a "borehole correction software" a2A. The memory a2 also stores a set of processing software a2B which includes a filter and a software block called the "measurement extraction software". The filter will be discussed in more detail later in this specification. For simplicity of discussion, the processing software a2B of FIG. 3 will be referred to as the "measurement extraction software a2B". A processor a3 is connected to the system bus. In operation, referring to FIG. 3 the processor a3 receives the dipole waveforms from the electronics cartridge 10d of the receiver 10c of the sonic tool 10 disposed downhole and, when told to begin processing by a user, commences execution of each of the instructions of the measurement extraction software a2B and generates a set of logs in response thereto representative of a set of estimated, measured, uncorrected shear wave slowness (MUSWS) data.

The MUSWS logs, generated as a result of execution of the measurement extraction software a2B, contain an inherent bias, which bias resulted from the processing performed by the computer 12a when executing the measurement extraction software a2B. This inherent bias must be eliminated. As a result, the processor a3 begins execution of the borehole correction software a2A. When the instructions of the borehole correction software a2A are being executed, the MUSWS logs, received as a result of execution of the measurement extraction software a2B, which contain the inherent bias, are corrected, i.e., a bias is subtracted from each value of the shear wave slowness contained within the MUSWS waveforms thereby producing true, corrected shear wave slowness (TCSWS) values and a corresponding true, corrected shear wave slowness log. A graphics film recorder a4 is connected to the system bus a1. The recorder a4 receives the output signals from the processor a3, representative of the true, corrected shear wave slowness data, and generates an output medium or print-out a5 (e.g., either a computer printout or a cathode ray tube (CRT) display) which reflects or otherwise sets forth therein the true, corrected shear wave slowness (TCSWS) log. The output medium a5 is presented to a customer for his analysis, from the log, of the characteristics of the formation and whether oil exists within the formation.

The computer system 12a, used in association with the preferred embodiment, might comprise, but is not limited to, one of the following computer systems manufactured by the Digital Equipment Corporation (DEC), Maynard, Mass.: (1) DEC VAX 8650, (2) DEC PDP-11, or (3) DEC VAXSTATION III.

The measurement extraction software a2B is fully described and set forth in U.S. Pat. No. 4,594,691 entitled "Sonic Well Logging", the disclosure of which is incorporated by reference into this specification.

In FIG. 3, the graphics film recorder a4 generates an output medium a5, such as a computer printout or display on a cathode ray tube (CRT).

Figure 4:
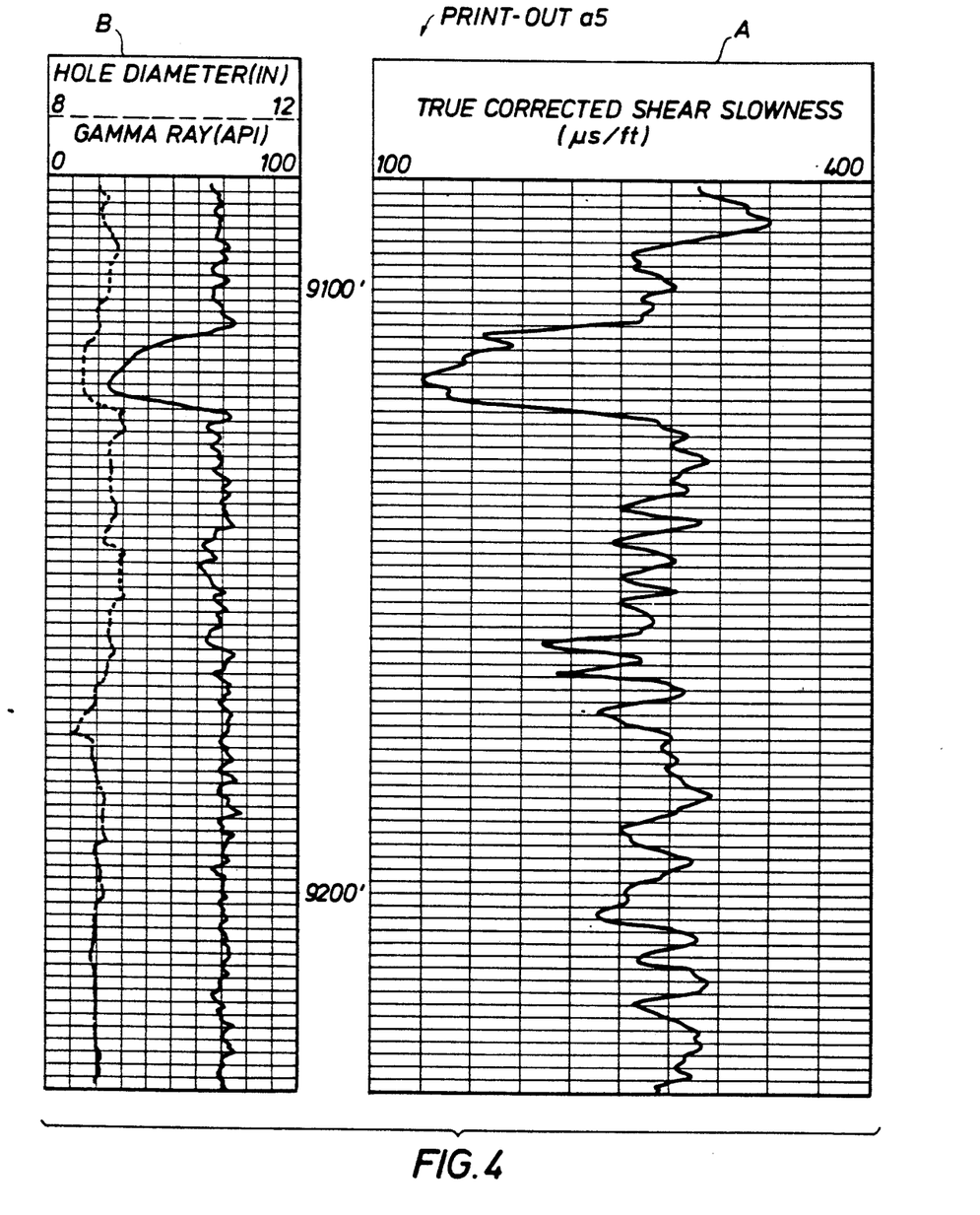
FIG. 4 illustrates an output medium, e.g., a printout from the computer of FIGS. 1 and 3, reflecting the true, corrected value of shear wave slowness.

Referring to FIG. 4, the output medium a5, such as a computer printout, generated by the graphics film recorder a4 of FIG. 3, is illustrated. In FIG. 4, the printout a5 includes a first chart A which reflects the true, corrected shear wave slowness in micro-seconds/foot at different depths of the borehole. Note that the shear wave slowness is actually an inverse-velocity figure, since velocity may be measured in feet per second. The printout a5 also includes a second chart B which reflects the amount of shaliness or sandiness of the formation in the borehole, the chart B measuring the natural gamma ray emissions of the formation. The printout a5 of FIG. 4 is generated by the graphics film recorder a4 of FIG. 3 and sets forth the true, corrected shear wave slowness (TCSWS) data associated with the shear waves propagating in the formation after such data has been corrected by the computer system 12a of FIG. 3 while executing the borehole correction software a2A of the present invention. The printout a5 is given to a customer for his analysis of the characteristics of the formation surrounding the borehole and of the possibility of oil existing in the formation.

Referring to FIGS. 5 through 9, a detailed construction of the borehole correction software a2A of FIG. 3 is illustrated.

Figure 5:
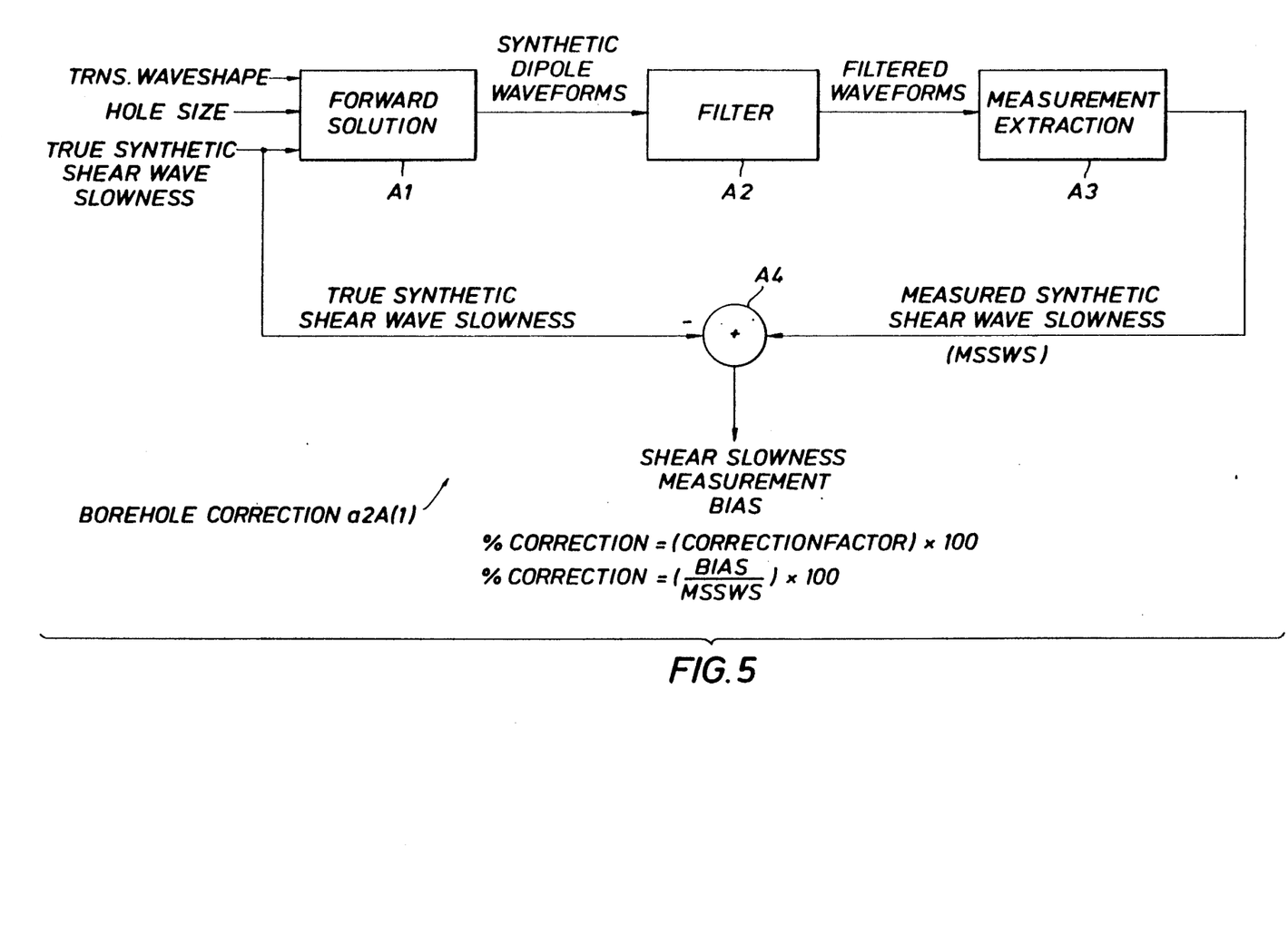
FIG. 5 illustrates a method practiced by the borehole correction software of generating a bias and a correction factor.
Figure 9:
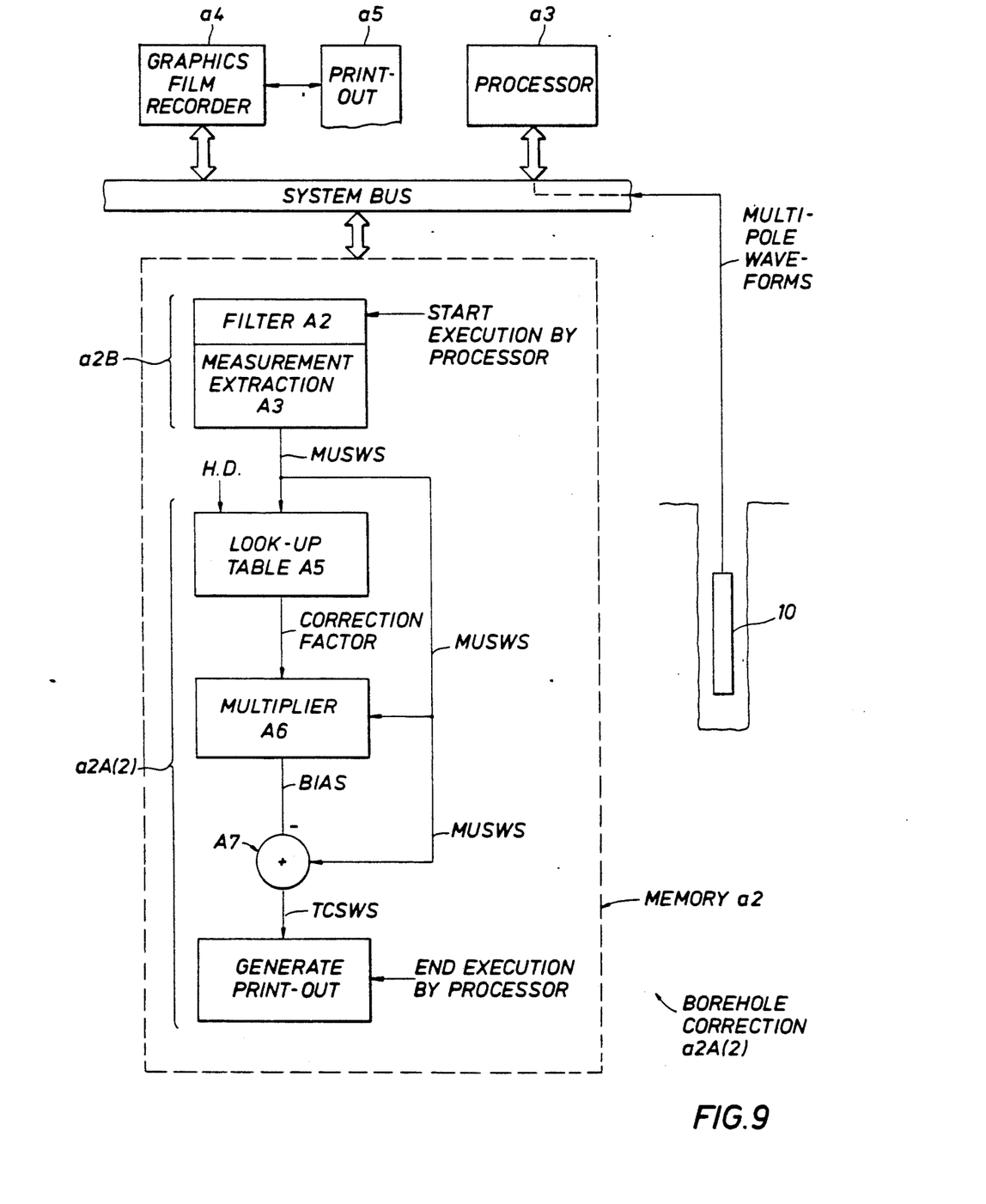
FIG. 9 illustrates a method practiced by the borehole correction software for generating an output medium reflecting a true, corrected value of shear wave slowness from a measured uncorrected value of shear wave slowness using the look-up table of FIG. 7.

FIGS. 5 and 7 represent a first part a2A(1) of the borehole correction software, and FIG. 9 represents a second part a2A(2) of the borehole correction software of the present invention.

Figure 6:
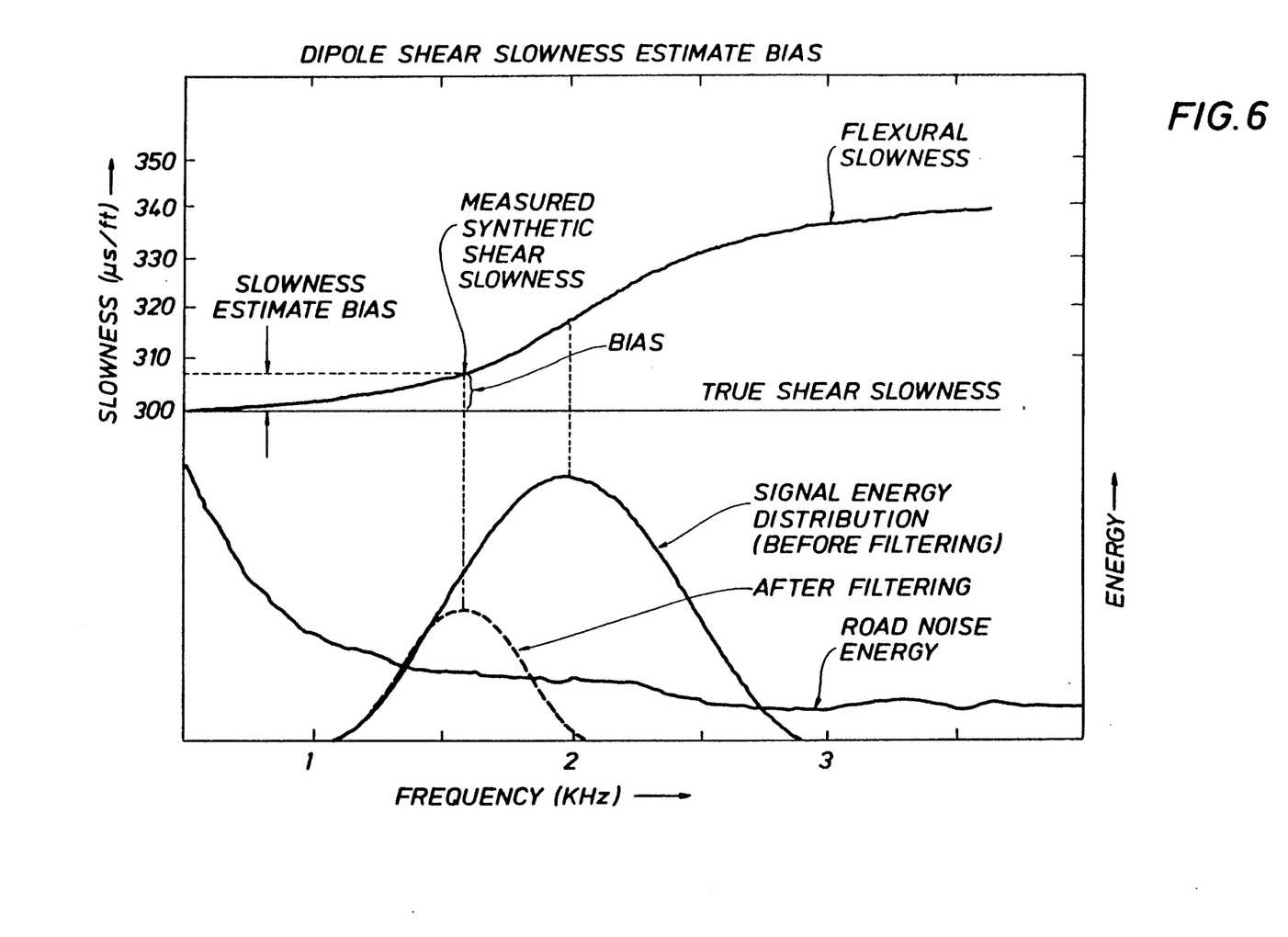
FIG. 6 illustrates a graphical description of the borehole correction.

Referring to FIG. 5, the first part of the borehole correction software a2A(1) is illustrated. In FIG. 5, three sets of data are fabricated and input to a Forward Solution Block A1, of the borehole correction software a2A(1). Firstly, a plurality of numbers entitled "True, synthetic shear wave slowness" are fabricated. These numbers are "synthetic" because they are merely hypothetical, that is, they are fabricated for the purpose of representing the true values of shear wave slowness associated with the shear waves propagating in the formation. Secondly, hypothetical values of hole size, intended to represent the diameter of the borehole, are also developed. Thirdly, data entitled "Transmitter Waveshape", intended to represent the shape of dipole waveforms transmitted into the formation, produced in response to a pressure wave developed from the dipole transmitter 10a of FIG. 1, is developed. These three sets of data, i.e., transmitter waveshape, hole size, and true synthetic shear wave slowness, are input to a first block of the borehole correction software a2A(1) termed "Forward Solution" A1. The Forward Solution A1 block synthesizes one dipole waveform for each receiver 10c of the sonic tool of FIG. 1 from the three sets of data input to the Forward Solution block A1, each set of dipole waveforms having a shear wave component contained therein. A filter A2 filters the dipole logs. Referring to FIG. 6, note the signal energy distribution before filtering associated with the output of the Forward Solution block A1 and note the signal energy distribution after filtering associated with the output of the filter A2. Therefore, filter A2 filters the signal energy distribution (before filtering) of FIG. 6 to produce the signal energy distribution after filtering. Referring again to FIG. 5, the filter A2 develops filtered waveforms which are input to another block of the borehole correction software a2A termed "Measurement Extraction" A3. Recall that the processing software a2B of FIG. 3 includes the filter A2 and the Measurement extraction software A3 of FIG. 5. The measurement extraction software a2B and A3 depicted in FIGS. 3, 5, and 9 are all identical, and is fully described in U.S. Pat. No. 4,594,691 entitled "Sonic Well Logging" already incorporated herein by reference. The Measurement Extraction block A3 estimates the shear wave slowness of each of the filtered dipole waveform sets synthesized by the Forward Solution block A1 and output from filter A2. The output of the Measurement Extraction block A3 develops, for each of the true, synthetic data input to block A1, "measured synthetic shear wave slowness" (MSSWS) data, i.e., data intended to represent measured shear wave slowness data, measured by the receivers 10c of the sonic tool, but synthetically produced from the hypothetical/synthetic true shear wave slowness data input to the Forward Solution block A1. The word "synthetic" is intended to convey the concept that the true shear wave slowness data input to block A1 was fabricated, and therefore, is "synthetic"; similarly, the measured shear wave slowness data output from the Measurement Extraction block A3 is also "synthetic" since it was produced from fabricated true shear wave slowness data. The plurality of true synthetic shear wave slowness (TSSWS) data input to the Forward Solution block A1 are subtracted, respectively, from the corresponding plurality of measured synthetic shear wave slowness (MSSWS) data output from the Measurement Extraction block A3, via summer A4, to produce a further corresponding plurality of bias figures (Shear Slowness Measurement Bias) corresponding to the plurality of true synthetic shear wave slowness figures that were fabricated and input to the Forward Solution block A1. The borehole correction software a2A(1) divides each bias figure output from summer A4 by its corresponding MSSWS figure output from the Measurement Extraction block A3 to produce a correction factor; and each correction factor is multiplied by 100 to produce a percent correction.

The Forward Solution block A1 is defined by the following relation. The pressure gradient on the axis of the borehole, in a homogeneous formation, at a distance "z" from transmitter 10a, at time "t" after transmitting, is given by:

$$\frac{dp(z, t)}{dr} = K \int_{-\infty}^{\infty} \int_{-\infty}^{\infty} S(\omega)A(k_z, \omega)e^{-j\omega t}e^{jk_z z}d\omega dk_z,$$

where S(w) is the time Fourier transform of the waveform from a point source transmitter, and $A(k_z,w)$ is the space time Fourier transform of the response of the borehole system to an impulsive dipole source. The above relation, defining the Forward Solution block A1, is discussed fully in "Acoustic Multipole Sources in Fluid-Filled Boreholes", 1986, by A. Kirkjian and S. Chang, GEOPHYSICS, V 51, pp. 148-163, the disclosure of which is incorporated by reference into this specification.

The output $y_m(n)$ of filter A2 of FIG. 5 defined by the following relation:

$$y_m(n) = \sum_{j=0}^{N-1} x_m(j)h(n-j)$$

where the filter characteristics $h(n-j)$ are defined as follows:

$$\text{filter} = \begin{cases} h(n), n = -\frac{NF-1}{2}, \ldots, 0, \ldots, \frac{NF-1}{2} \\ 0, \text{else} \end{cases}$$

\# of waveforms to be processed = M
\# of samples per waveform = N
filter length = NF
and where the input waveforms $x_m(n)$ or $x_m(j)$ are defined as follows:

$$\text{waveforms} = \begin{cases} x_m(n). \ m = 0, 1, \ldots, M-1; \\ n = 0, 1, \ldots, N-1 \\ 0, \text{else} \end{cases}$$

The Measurement Extraction block A3 is defined by the following relation. Given that a measured waveform at receiver "m" is denoted as $X_m(t) = X(z(m),t)$, the slowness measurement is given by the maximum over slownesses "s" and arrival times "T" of:

$$\sigma(s, \tau) = \frac{\frac{1}{M} \int_{t=0}^{T_w} \left[ \sum_{m=0}^{M-1} X_m(t + s(z_m - z_0) + \tau) \right]^2 dt}{\sum_{m=0}^{M-1} \int_{t=0}^{T_w} [X_m(t + s(z_m - z_0) + \tau)]^2 dt},$$

where $T_w$ is a measurement averaging time, and M is the total number of receivers in the array. The above relation, defining the measurement extraction block A3, is discussed fully in (1) U.S. Pat. No. 4,594,691 entitled "Sonic Well Logging"; and in (2) "Semblance Processing of Borehole Acoustic Array Data"; 1984; C. Kimball and T. Marzetta; GEOPHYSICS V. 49, pp 274–281, the disclosures of which are incorporated by reference into this specification.

Referring to FIG. 6, a graphical description of the borehole correction being performed by the borehole correction software a2A of the present invention is illustrated.

In FIG. 6, the straight, horizontal line disposed at 300 us/ft slowness is the true synthetic shear slowness, input to the Forward Solution block A1 of FIG. 5. The curved line labelled "Flexural slowness" actually represents the flexural slowness component of the dipole waveforms propagating in the formation, since the flexural component is the most dominant component of the dipole waveforms; however, the measured uncorrected shear wave component closely approximates the flexural wave component of the dipole waveforms propagating in the formation at the measurement frequency; thus, it is not inaccurate to use the flexural component to represent the measured synthetic shear wave slowness. Therefore, as indicated in FIG. 6, each of the plurality of values of the true synthetic shear slowness is subtracted from the corresponding values of the measured synthetic shear slowness in FIG. 6 to obtain the bias figure, which bias figure is utilized in obtaining the correction factor (the correction factor being the bias figure divided by the measured synthetic shear wave slowness, as indicated in FIG. 5).

Recalling that the embodiment of the borehole correction software a2A(1) of FIG. 5 produced a plurality of measured synthetic shear wave slowness (MSSWS) figures, output from Measurement Extraction block A3, a corresponding plurality of bias figures output from summer A4, and a further corresponding plurality of correction factors (as noted in FIG. 5 as being bias/MSSWS), for various hole diameters input to the Forward Solution block A1, the borehole correction software a2A, at this point of its process, builds a look up table.

Referring to FIG. 7, the look up table referenced hereinabove, built by the borehole correction software a2A of the present invention, is illustrated. In FIG. 7, the look up table essentially comprises three columns, a first column being the hole diameter of the borehole, the second column being the measured synthetic shear wave slowness (MSSWS) output from the Measurement Extraction block A3 of FIG. 5, and the third column being the correction factor (bias/MSSWS) developed in association with the first portion a2A(1) of the borehole correction software shown in FIG. 5. The look up table includes a plurality of measured synthetic shear wave slowness values and a corresponding plurality of correction factors for each hole diameter. The letters A through R in FIG. 7 are given by way of illustration only and do not represent actual values of shear wave slowness or correction factors. The function of the look up table of this FIG. 7 will be illustrated more clearly with reference to FIG. 9 hereinbelow.

Figure 8:
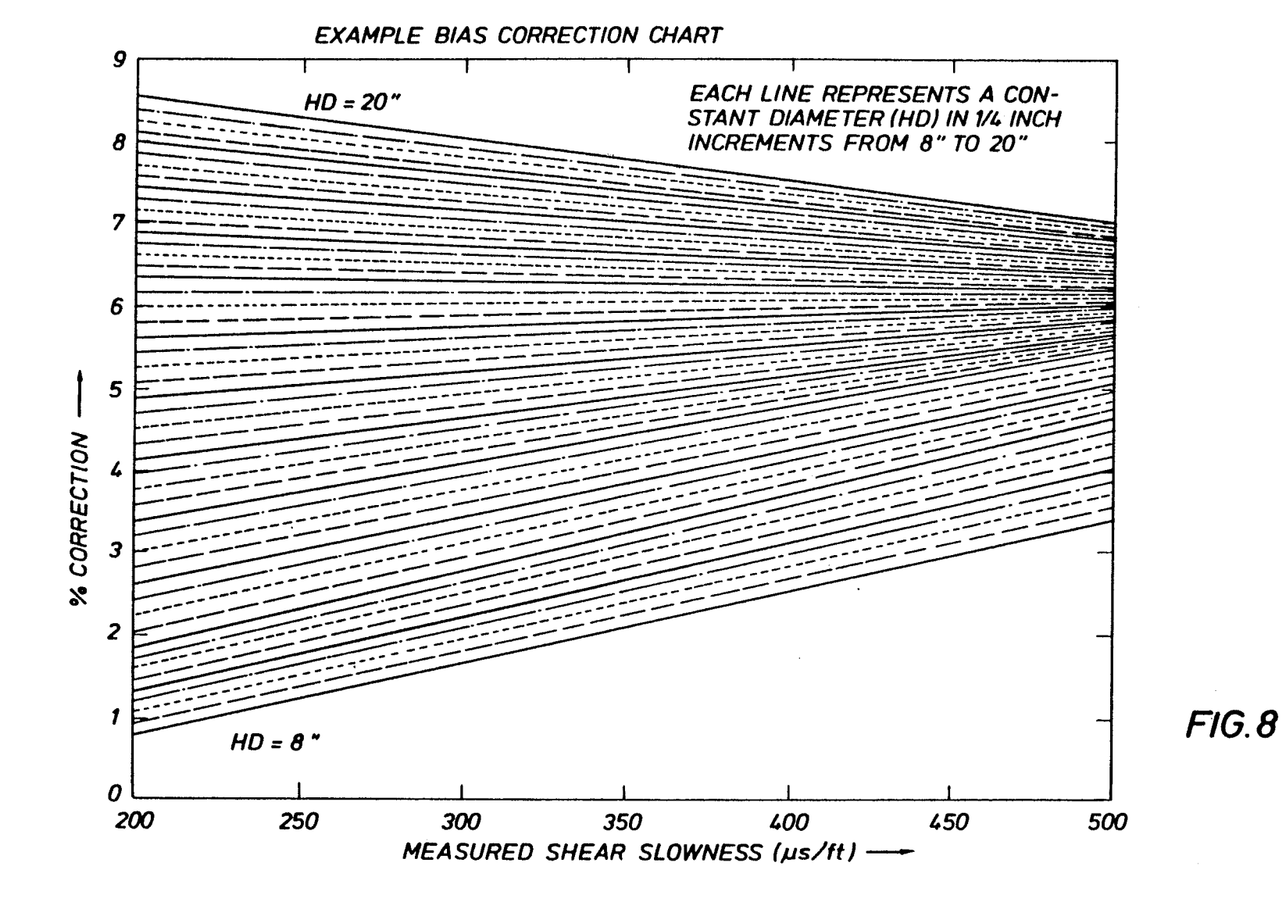
FIG. 8 illustrates a graph of data set forth in the lookup table of FIG. 7.

Referring to FIG. 8, the data from the look up table of FIG. 7 is used to construct a bias correction chart including a series of lines in an X-Y coordinate system, where the Y-axis represents percent correction and the X axis represents measured synthetic shear wave slowness (MSSWS) in us/ft, and each line represents a hole-diameter of the borehole.

Referring to FIG. 9, the second part a2A(2) of the borehole correction software of FIG. 3 is illustrated.

In FIG. 9, the receivers 10c of the sonic tool of FIG. 1 receive dipole waveform data from the formation, and this waveform data is transmitted uphole to the well logging truck computer 12a via cable 14. The dipole waveform data is first processed by the processing software a2B which includes the filter A2 and the measurement extraction software A3, as shown in FIG. 9. The measurement extraction software A3, when executed by processor a3, estimates the shear wave slowness component of the multipole waveform data, and generates further data hereinafter termed "measured, uncorrected shear wave slowness (MUSWS)" data. The MUSWS data contains an inherent bias produced as a result of the processing of the measurement extraction software instructions by processor a3. As noted earlier, the Measurement Extraction software A3 is fully described in U.S. Pat. No. 4,594,691 entitled "Sonic Well Logging", the disclosure of which has already been incorporated herein by reference. Therefore the bias inherent in the MUSWS data must be corrected. The bias inherent in the MUSWS data is corrected during execution of the second part of the borehole correction software a2A(2) of the present invention.

The second part of the borehole correction software a2A(2) shown in FIG. 9 includes a look up table A5, a multiplier A6, and a summer A7. The MUSWS data from the Measurement Extraction block A3 is input to the look up table A5. This look up table A5 is identical to the look up table discussed hereinabove with reference to FIG. 7 and 8 of the drawings. The first part of the borehole correction software a2A(1) discussed with reference to FIG. 5 functioned ultimately to determine the data needed to build the look up table A5, namely the MSSWS data and the correction factor, which has been defined as being the bias divided by the MSSWS (bias/MSSWS). Once the look up table A5 is built, the MUSWS data generated by the Measurement Extraction block A3 of FIG. 9, associated with the software stored in memory a2, is functionally input to the look-up table A5, to a software multiplier A6, and to a summer A7. The sonic tool 10 determines the borehole diameter (HD) data via a separate means and provides the (HD) data as an additional input to the look up table A5. The output of the look-up table A5 is functionally input to the multiplier A6, the output of the multiplier A6 being functionally input to the summer A7, as shown in FIG. 9. The output of the summer A7 provides the true, corrected shear wave slowness (TCSWS) data which is reflected on the output medium a5, such as the computer printout a5 of FIG. 3.

The functional operation of the look-up table A5 and the second part of the borehole correction software a2A(2) of FIG. 9 is described in the following paragraphs.

Referring to FIGS. 7 and 9, the MUSWS data as well as the hole diameter (HD) of the borehole are input to the look up table A5, the table of FIG. 7. The hole diameter (HD) is located in the first column of the table of FIG. 7 under the column heading "hole diameter" and the MUSWS data is located in the second column of the table under the column heading "MSSWS". Assuming that the hole diameter and the (MUSWS) match exactly the (HD) and the (MSSWS) in the first and second columns of the table, when the MSSWS figure, matching the MUSWS figure, is found in the second column associated with the correct hole diameter in the first column, the associated "correction factor" is read from the third column of table A5 of FIGS. 7 and 9 and is input to multiplier A6 of FIG. 9. Recalling that the correction factor is defined as being "bias/MSSWS", and since the MUSWS is nearly equal to the MSSWS, the correction factor input to multiplier A6 is multiplied by the MUSWS also input to the multiplier A6. The MUSWS cancels the MSSWS in the denominator of the correction factor, leaving the "bias" as the result. Consequently, the bias is output from multiplier A6 and input to the negative side of the summer A7. However, the MUSWS from the Measurement Extraction block A3 is input to the positive side of the summer A7. When the bias is subtracted from the MUSWS, the true, corrected shear wave slowness (TCSWS) is the result. This true, corrected shear wave slowness (TCSWS) is reflected on the printout a5 of FIG. 4 generated by the graphics film recorder a4 of FIG. 3. For each MUSWS figure output from the Measurement Extraction block A3, a true, corrected shear wave slowness figure is output from summer A7. Therefore, a plurality of values of true, corrected shear wave slowness (TCSWS) determine the graph of true, corrected shear wave slowness set forth in FIG. 4 of the drawings. The printout a5 of FIG. 4 is given to a customer for his determination of the characteristics of the formation in the borehole and the possibility of oil in the formation.

Assume that the hole diameter (HD) and the MUSWS data, input to table a5, do not match the HD and the MSSWS data found in the first and second columns of the table A5. In order to locate a desired correction factor, a "nearest neighbor" approach is utilized. The closest hole diameter (HD) in the first column of table A5 is located associated with the hole diameter (HD) input to the table. Associated with the closest hole diameter, the MSSWS, in the second column of the table A5, closest to the MUSWS input to table A5, is selected. The correction factor, in the third column of the table, associated with the selected MSSWS figure, is read from the table and used as the correction factor input to multiplier A6 of FIG. 9.

The invention being thus described, it will be obvious that the same way be varied in may ways. Such variations are not to be regarded as a departure from the spirit and scope of the invention, and all such modifications as would be obvious to one skilled in the art are intended to be included within the scope of the following claims.

I claim:

1. An apparatus adapted to respond to multipole waveform data developed by a well tool when said well tool is disposed in a borehole for generating a set of true corrected shear wave slowness data and for recording said set of true corrected shear wave slowness data on an output record medium, said true corrected shear wave slowness data representing shear wave slowness data which has been corrected to remove an inherent bias error, comprising:

receiving means for receiving said multipole waveform data;

measured uncorrected data determination means responsive to the receipt of said multipole waveform data for determining measured uncorrected shear wave slowness data from said multipole waveform data, said measured uncorrected shear wave slowness data inherently including said bias error;

bias error determination means responsive to the measured uncorrected shear wave slowness data for determining said bias error;

correction means responsive to said bias error determination by said bias error determination means and to said measured uncorrected shear wave slowness data determined by said measured uncorrected data determination means for correcting said measured uncorrected shear wave slowness data using said bias error thereby generating said set of true corrected shear wave slowness data; and recording means for recording said set of true corrected shear wave slowness data on said output record medium.

2. The apparatus of claim 1, wherein said bias error determination means comprises:

table means responsive to the measured uncorrected shear wave slowness data for receiving a plurality of correction factors and a corresponding plurality of measured synthetic shear wave slowness data and for generating one of said correction factors when said measured uncorrected shear wave slowness data most nearly matches one of the measured synthetic shear wave slowness data stored in said table means; and multiplier means responsive to the correction factor generated by said table means and to said measured uncorrected shear wave slowness data generated by said measured uncorrected data determination means for multiplying said measured uncorrected shear wave slowness data by said correction factor thereby producing said bias error.

3. The apparatus of claim 2, wherein said table means comprises:

means responsive to a plurality of hypothetical data including hypothetical true, correct shear wave slowness data and a plurality of hole sizes each representing a diameter of said borehole for generating a set of hypothetical multipole waveforms corresponding to the hypothetical data;

measurement extraction means responsive to the set of hypothetical multipole waveforms for generating a corresponding set of measured synthetic shear wave slowness data, each said measured synthetic shear wave slowness data including said inherent bias error;

means responsive to the measured synthetic shear wave slowness data and to the hypothetical true, correct shear wave slowness data for subtracting said hypothetical true data from said measured synthetic data thereby producing a corresponding plurality of bias errors, each of the bias errors representing said inherent bias error; and means for dividing said bias errors by the respective corresponding measured synthetic shear wave slowness data to produce a plurality of correction factors, said table means including said plurality of hole sizes and a corresponding plurality of the measured synthetic shear wave slowness data for each of the hole sizes and a further corresponding plurality of the correction factors for each of the hole sizes.

4. The apparatus of claim 2, wherein said correction means comprises summer means for subtracting the bias error from said measured uncorrected shear wave slowness data thereby generating said set of true corrected shear wave slowness data.

5. A well logging system including a well tool adapted to be disposed in a borehole and an apparatus adapted to be connected to the well tool, said well tool including a transmitter and a receiver where said receiver develops multipole waveform data, said apparatus being adapted to respond to said multipole waveform data for developing a set of true correct shear wave slowness data and for recording said true corrected shear wave slowness data on an output record medium, said true corrected shear wave slowness data representing shear wave slowness data which has been corrected to remove an inherent bias error, said apparatus comprising:

receiving means for receiving said multipole waveform data;

measured uncorrected data determination responsive to the receipt of said multipole waveform data for determining measured uncorrected shear wave slowness data from said multipole waveform data, said measured uncorrected shear wave slowness data inherently including said bias error;

bias error determination means responsive to the measured uncorrected shear wave slowness data for determining said bias error;

correction means responsive to said bias error determined by said bias error determination means and to said measured uncorrected shear wave slowness data determined by said measured uncorrected data determination means for correcting said measured uncorrected shear wave slowness data using said bias error thereby generating said set of true corrected shear wave slowness data; and recording means for recording said set of true corrected shear wave slowness data on said output record medium.

6. The well logging system of claim 5, wherein said bias error determination means comprises:

table means responsive to the measured uncorrected shear wave slowness data for recording a plurality of correction factors and a corresponding plurality of measured synthetic shear wave slowness data and for generating one of said correction factors when said measured uncorrected shear wave slowness data most nearly matches one of the measured synthetic shear wave slowness data stored in said table means; and multiplier means responsive to the correction factor generated by said table means and to said measured uncorrected shear wave slowness data generated by said measured uncorrected data determination means for multiplying said measured uncorrected shear wave slowness data by said correction factor thereby producing said bias error.

7. The well logging system of claim 6, wherein said correction means comprises summer means for subtracting the bias error from said measured uncorrected shear wave slowness data thereby generating said set of true corrected shear wave slowness data.

8. A method of determining true corrected shear wave slowness data and recording said true corrected shear wave slowness data on an output record medium, said true corrected shear wave slowness data being determined from multipole waveform data developed by a well tool when said well tool is disposed in a borehole and representing shear wave slowness data which has been corrected to eliminate an inherent bias error, comprising the steps of:

(a) estimating shear wave slowness data from said multipole waveform data, the estimated shear wave slowness data including said bias error;

(b) determining said bias error in response to the estimated shear wave slowness data;

(c) removing said bias error from the estimated shear wave slowness data thereby determining corresponding true corrected shear wave slowness data; and (d) recording said true corrected shear wave slowness data on said output record medium.

9. The method of claim 8, wherein the determining step (b) comprises the steps of:

(e) building a table, the table including a plurality of correction factors;

(f) using the estimated shear wave slowness data, interrogating said table, said estimated shear wave slowness data corresponding to one of said correction factors; and (g) arithmetically operating on said estimated shear wave slowness data and said one of said correction factors to determine said bias error.

10. The method of claim 9, wherein the building step (e) comprises the steps of:

(h) determining a set of hypothetical data including a set of hypothetical true shear wave slowness data for each of a plurality of hypothetical borehole diameters;

(i) using said set of hypothetic data, determining a set of hypothetical measured shear wave slowness data corresponding, respectively, to the set of hypothetical true shear wave slowness data;

(j) determining a bias error from the hypothetical true shear wave slowness data and the hypothetical measured shear wave slowness data;

(k) determining a correction factor from each bias error and each hypothetical measured shear wave slowness data; and (L) constructing a table having at least three columns including said borehole diameter, said hypothetical measured shear wave slowness data, and said correction factor.

11. The method of claim 9, wherein the operating step (g) includes the step of multiplying said estimated shear wave slowness data by said correction factor to determine said bias error.

* * * * *